United States Patent [19]
Shirakata et al.

[11] Patent Number: 5,511,194
[45] Date of Patent: Apr. 23, 1996

[54] PROCESSING SYSTEM AND PROCESSING METHOD CAPABLE OF DYNAMICALLY REPLACING JOB ENVIRONMENT

[75] Inventors: Yoko Shirakata; Noriko Kozu, both of Kawasaki, Japan

[73] Assignee: Fujitsu Limited, Kawasaki, Japan

[21] Appl. No.: 112,755

[22] Filed: Aug. 25, 1993

[30] Foreign Application Priority Data

Aug. 28, 1992 [JP] Japan ................................. 4-230195

[51] Int. Cl.$^6$ ................................................ G06F 9/40
[52] U.S. Cl. ........................... 395/650; 364/DIG. 1; 364/281.8
[58] Field of Search .......................... 395/650, 500

[56] References Cited

U.S. PATENT DOCUMENTS

| | | | |
|---|---|---|---|
| 5,101,491 | 3/1992 | Katzeff | 364/DIG. 1 |
| 5,155,837 | 10/1992 | Liu et al. | 364/DIG. 1 |
| 5,339,430 | 8/1994 | Lundin et al. | 364/DIG. 1 |

FOREIGN PATENT DOCUMENTS

| | | |
|---|---|---|
| 1-154235 | 6/1989 | Japan . |
| 1-232432 | 9/1989 | Japan . |
| 1-296790 | 11/1989 | Japan . |
| 2-139630 | 5/1990 | Japan . |

*Primary Examiner*—Thomas M. Heckler
*Attorney, Agent, or Firm*—Greer, Burns & Crain, Ltd.

[57] ABSTRACT

A processing system in which a service is executed by a current job using resources under a predetermined environment includes a job activating instruction unit for outputting an activation instruction to activate a new job operating under a changed environment, a job generation unit for generating the new job and for assigning a waiting attribute to the new job so that the new job is in a waiting condition, in response to the activation instruction from the job activating instruction unit, a job replacing instruction unit for outputting a replacement instruction to replace the current job to the new job being in the waiting condition, a job replacement unit for selecting resources to be used in the new job from among the resources used in the current job, for assigning selected resources to the new job, and for releasing the waiting condition from the new job, in response to the replacement instruction from the job replacing instruction unit, and a current job withdrawing unit for withdrawing the current job from the processing system after operations of the job replacement unit are completed.

3 Claims, 11 Drawing Sheets

| START (ACP) | JOB = JOB NAME<br>CJOB = CURRENT JOB NAME<br>TYPE = WAIT |
|---|---|

FIG. 6B

| REPLACE (ACP) | JOB = JOB NAME |
|---|---|

FIG. 7

|   | CURRENT RESOURCE | WAITING RESOURCE |
|---|---|---|
| (1) | OPENED (START OF SERVICE | ——— (—) |
| (2) | OPENED (MIDDLE OF SERVICE) | OPENED (—) |
| (3) | OPENED (WAIT FOR END OF SERVICE) | OPENED (WAIT FOR START OF SERVICE) |
| (4) | TERMINATING (END OF SERVICE) | OPENED (MIDDLE OF SERVICE) |
| (5) | ——— | OPENED (MIDDLE OF SERVICE) |

FIG. 8

```
001  //TSSUSER1     JOB  0013,'1682SQ57116 ···
002  //             CLASS=A,MSGCLASS=A
003  //ACP00        EXEC  PGM=JXGIJSM, TIME= ···
004  //STEPLIB      DD    DSN=Q0018.COBOL.C ···
005  //             UNIT=SYSDA
006  //AIMPED       DD    SUBSYS=(AIM,CNPED ···
007  //SYSMDUMP     DD    DSN=C3128.DUMP00, ···
008  //AIMSNAP      DD    SYSOUT=A
009  //AIMPGM       DD  DSN=AIMSMG.MSPV20.APP ···
010  //**SYSABEND   DD    SYSOUT=A
011  //AIMACPIN     DD    *
012        JOB   NAME=CNPEDAA0.DUMPL=4
013        MQN   NAME=CNMQNAA0,
014              APLTYPE=WAIT
015        APL   NAME=CNSMAA0,
016  **          LOCALTC=YES,
017              RENAME=CNAPL99
018  /*
019  //
```

PROCESSING SYSTEM AND PROCESSING METHOD CAPABLE OF DYNAMICALLY REPLACING JOB ENVIRONMENT

BACKGROUND OF THE INVENTION

1. Field of the Invention

The present invention relates to a processing system and a processing method both of which are capable of dynamically changing from processing one job to processing another one in which application programs and system environment definition are changed, without stopping the service in the processing system.

2. Description of the Related Art

With the increasing of service time and the internationalization of enterprises, it is required that online processing systems are continuously driven for 24 hours every day. In a case where the service to be executed in an online processing system must be changed and extended under a condition where the online system can not be stopped as described above, it is necessary to dynamically replace a job needed to execute the service.

Conventionally, in a case where various environments needed to run application programs for commercial use are changed in an online system, and in a case where the service to be executed in an online system is switched in accordance with periods of time, after a job using the application programs for commercial use is temporarily stopped, the system must be restarted. That is, in the above cases, it is necessary to temporarily stop the service in the online processing system. As a result, a continuous operation for 24 hours without stopping can not be executed.

Figure 1:
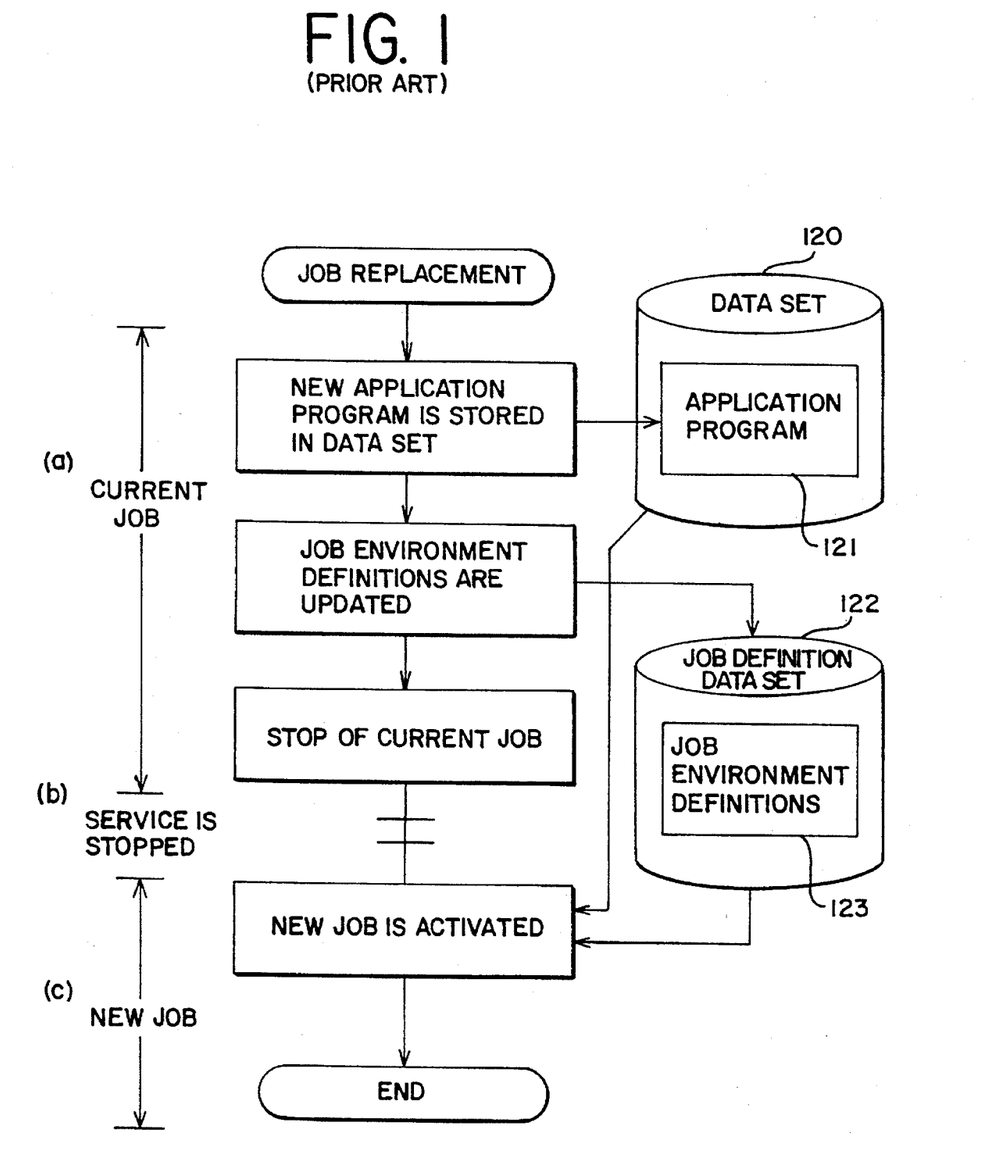
FIG. 1 is a flow chart illustrating a conventional process for replacing a job to be processed in a processing system.

FIG. 1 shows a conventional process in a case where a job to be processed in the online processing system is replaced. For example, in a case where the service executed by the application programs is extended and/or changed, the process shown in FIG. 1 is executed.

Referring to FIG. 1, in the initial step (a), first, while the system is being operated with a current job which is to be replaced, a new application program 121 by which the service is extended and/or changed is stored in a data set 120. Next, job environment definitions 123 stored in a job definition data set 122 are updated. After this, the current job to be replaced is stopped.

In the next step (b), due to the stopping of the current job to be replaced, the service is temporarily stopped in the online system.

In the last step (c), a new job using the new application program 121 by which the service is extended and/or changed is activated, and the new job is performed by the system.

As has been described above, in order to change the job environment, the service which has been under operation with a current job is stopped, and the service is then restarted with a changed job. In addition, input messages from terminal equipments are distributed to application programs. However, if a plurality of same destination codes identifying an application program exist simultaneously in the system, the messages can not be distributed to the application program. That is, a plurality of jobs using the application program identified by the same destination code can not be simultaneously activated.

A fault tolerant system has been proposed in which a current process is automatically switched to a sub process at a time a fault occurs in the current process. However, the current process and the sub process do not have the same resources, and thus it is necessary for the system to have a detailed interface program for inheriting resources from the current process to the sub processes.

SUMMARY OF THE INVENTION

Accordingly, a general object of the present invention is to provide a novel and useful processing system and processing method in which the disadvantages of the aforementioned prior art are eliminated.

A more specific object of the present invention is to provide a processing system and a processing method in which a job processed therein can be changed without stopping the service such as the online service.

The above objects of the present invention are achieved by a processing system in which a service is executed by a current job using resources under a predetermined environment comprising: job activating instruction means for outputting an activation instruction to activate a new job operating under a changed environment; job generation means, coupled to the job activating instruction means, for generating the new job and for assigning a waiting attribute to the new job so that the new job is in a waiting condition, in response to the activation instruction from the job activating instruction means; job replacing instruction means for outputting a replacement instruction to replace the current job with the new job being in the waiting condition; job replacement means, coupled to the job replacing instruction means, for selecting resources to be used in the new job from among the resources used in the current job, for assigning selected resources to the new job, and for releasing the new job from the waiting condition, in response to the replacement instruction from the job replacing instruction means; and current job withdrawing means, coupled to the job replacement means, for withdrawing the current job from the processing system after operations of the job replacement means are completed.

According to the present invention, the current job can be replaced with the waiting job without interrupting the service in the processing system.

Another object of the present invention is to provide a processing system and a processing method in which, even if a current job to be changed and a waiting job using an application program identified by the same destination code simultaneously exist in the system, messages from terminal equipments can be distributed to the application programs without fault in the service.

The above objects of the present invention are achieved by a processing system in which a service is executed by a current job among a plurality of jobs using resources under a predetermined environment comprising: message control means for managing message queues so that messages having destination codes identifying jobs in which the messages are to be supplied are distributed to the message queues in accordance with the destination codes, the messages being supplied from external devices; and job activating means for activating a waiting job which is a job being in a waiting condition, the waiting job being identified by the same destination code as the current job, wherein the message control means comprises: message distribution means, in response to an instruction to replace the current job to the waiting job, for assigning a message used in a service which has been performed by the current job to a message queue for the current job, and for assigning a message used in a new service which will be performed by the waiting job to a message queue for the waiting job.

The above objects of the present invention are also achieved by a processing method executed in a processing system in which a service is executed by a job using resources under a predetermined environment, the processing method comprising steps of: (a) generating a current job which is in an operating condition; (b) generating a waiting job using resources identified by the same destination codes as those of the current job, the waiting job being a job which is in a waiting condition; (c) distributing messages supplied from external terminals to the current job and the waiting job so that messages used in a service currently being performed are assigned to the current job and messages used in a service which to be performed are assigned to the waiting job; (d) terminating the current job when the service executed by the current job is completed and withdrawing the resources used by the current job; and (e) switching the environment under which the current job is operated to the environment under which the waiting job is to be operated, so that the current job is replaced with the waiting job.

According to the present invention, even if a current job to be changed and a waiting job using a application program identified by the same destination code simultaneously exist in the system, messages from terminal equipments can be distributed to the application programs without fault in the service.

Additional objects, features and advantages of the present invention will become apparent from the following detailed description when read in conjunction with the accompanying drawings.

DESCRIPTION OF THE PREFERRED EMBODIMENTS

A description will now be given, with reference to FIG. 2, of the principle of a processing system according to the present invention.

Figure 2:
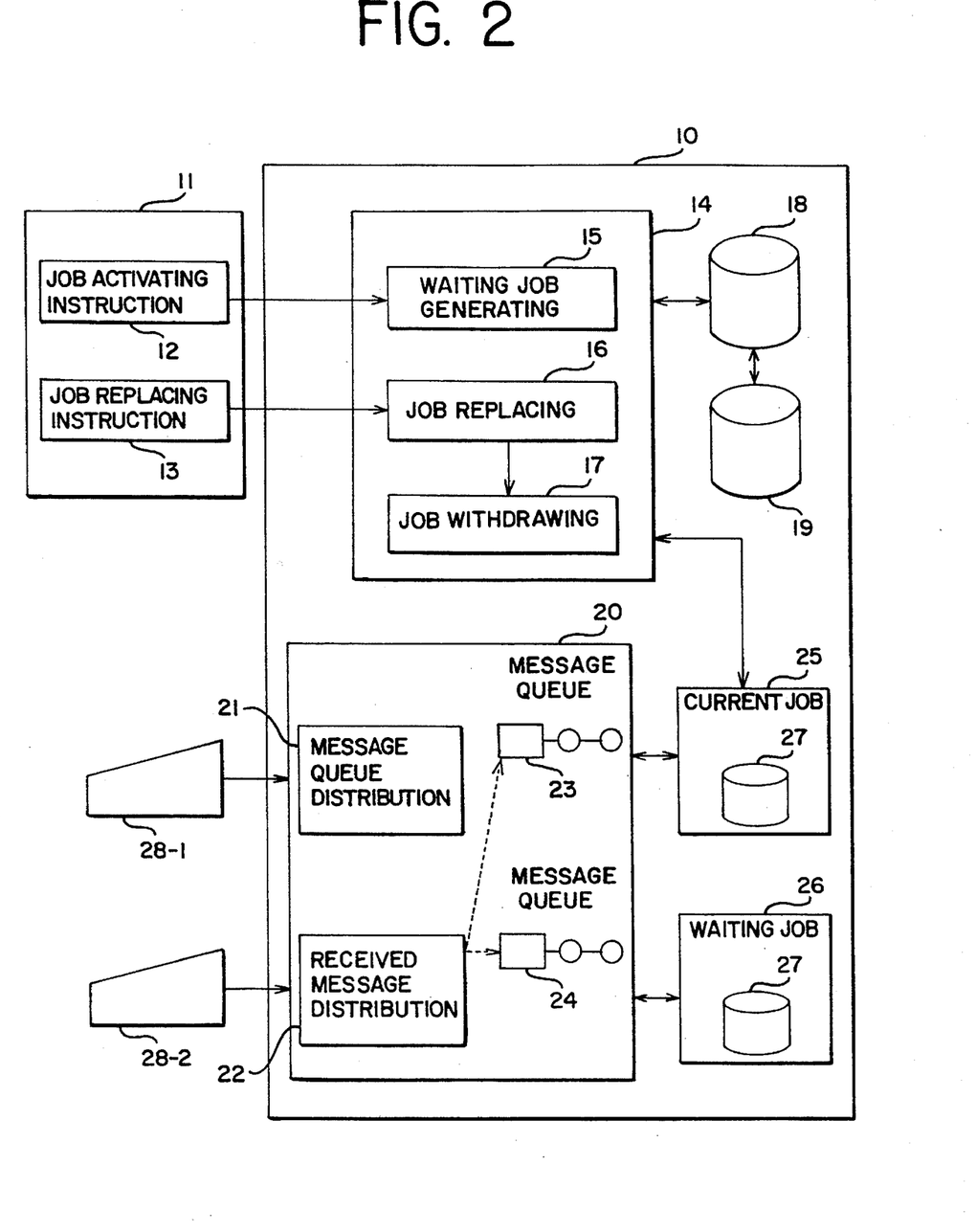
FIG. 2 is a diagram illustrating the principle of a processing system according to the present invention.

Referring to FIG. 2, a processing system 10 is provided with a command input device 11 formed on, for example, a center console of the processing system. The command input device 11 has a job activating instruction unit 12 and a job replacing instruction unit 13. The job activating instruction unit 12 and the job instruction unit 13 respectively supply an activation command and a replacement command to the processing system 10. The processing system 10 has a job management portion 14, job control language (JCL) 18, an environment definition set 19, a message controller 20, a current job 25, and a waiting job 26. The job management portion 14 has a waiting job generating unit 15, a job replacing unit 16 and a job withdrawing unit 17, and performs an activating control and a terminating control of the job. The job control language 18 describes definition information of a job. The environment definition set 19 defines environment regarding a message queue through which the job receives input messages and resources, such as a data base, used by the job. The message controller 20 has a message queue distribution portion 21, a received message distribution portion 22, a first message queue 23 and a second message queue 24. In the first message queue 23, messages distributed to the current job 25 are queued. In the second message queue 24, messages distributed to the waiting job 26 are queued. The current job 25 and the waiting job 26 respectively use computer resources 27 and 27'. Terminal devices 28-1 and 28-2 for inputting a processing request with respect to a job are connected to the processing system 10.

The activation command output from the job activating instruction unit 12 indicates an instruction for the processing system 10 to assign a waiting attribute to the waiting job 26 defined so as to be performed under a changed job environment and to activate the waiting job 26. The replacement command output from the job replacing instruction unit 13 indicates an instruction for the processing system 10 to replace the current job 25 defined so as to be performed under a predetermined job environment to the waiting job 26. The waiting job generating unit 15 generates a new job set in a waiting condition (to which the waiting attribute is assigned) in response to the activation command supplied from the job activating instruction unit 12. The new job to which the waiting attribute is assigned is the waiting job 26. The job replacing unit 16 selects, in response to the replacement command supplied from the job replacing instruction unit 13, resources to be used in the waiting job 26 from among the resources used in the current job 27 and assigns selected resources to the waiting job 26. The job replacing unit 16 then releases the waiting job 26 from the waiting condition. After the replacement of the job by the job replacing unit 16, the job withdrawing unit 17 terminates the current job 25 and withdraws the resources 27 of the terminated job 25 therefrom.

The message controller 20 supervises first and second message queues 23 and 24 such that input messages are distributed to the message queues 23 and 24 in accordance with destination codes identifying the jobs 25 and 26. The message queue distribution unit 21 of the message controller 20, in response to the instruction to replace the current job 25 with the waiting job 26, distributes messages regarding the service which has been started in the processing system 10 to the first message queue 23 for the current job 25 and distributes messages regarding service to be started in the processing system 10 to the second message queue 24 for the waiting job 26. The received message distribution unit 22 determines whether messages supplied from the terminal equipments 28-1 and 28-2 after replacing the job are messages regarding the service which is currently being executed by the current job 25 or messages regarding the new service to be started, and distributes the messages to the first message queue 23 or the second message queue 24. The waiting job generating unit 15 activates the waiting job 26 having the destination codes, to which messages are to be distributed, as the current job 25 so that the messages can be distributed to the waiting job 26 and the current job 25 without terminating the service.

The service may be extended and/or changed under a condition where the service is executed by the current job 25, as follows.

While the service is being continuously performed by the current job 25, the job control language 18 and the environment definition set 19 regarding application programs and data bases identified by the job control language 18 are updated. The job activating instruction unit 12 then outputs the activation command for activating the waiting job 26. The waiting job generating unit 15 receives the activation command, generates a new job based on the job control language 18, and sets the job in the waiting condition. That is, the waiting job 26 is generated.

Next, the job replacing instruction unit 13 outputs the replacement command to replace the current job 25 with the waiting job 26. The job replacing unit 16 receives the replacement command, releases the waiting job 26 from the waiting condition, and supplies to the message controller 20 an instruction of distribution of messages. Due to this instruction, if there is a message regarding the start of the new service in the first message queue 23, the message is transferred to the second message queue 24 by the message queue distribution portion 21. The received message distribution portion 22 determines whether messages supplied from the terminal devices 28-1 and 28-2 relate to the service which is currently being performed or to the new service to be performed, and then the messages are distributed to the first message queue 23 and the second message queue in accordance with the determination results.

When the process for executing the service in accordance with the current job 25 is terminated, the job withdrawing unit 17 causes the current job 25 to be inactive, and withdraws the resources 27 of the current job 25 therefrom. Thus, the operation environment for the current job 25 is changed to that for the waiting job 26. After this, the waiting job is processed as the next current job.

In the present invention, the waiting attribute is assigned to a new job, and the new job is then activated. Thus, a plurality of jobs having the same resources can be simultaneously activated. That is, in response to the activation instruction of a new job to which the waiting attribute is assigned, the new job having the same application programs and the same names (destination codes) thereof as the job currently being processed is generated. The new job is maintained in the waiting condition until the replacing command is supplied to the system.

The job may have the following resources:

(1) data bases/data sets;

(2) application programs; and (3) a message queue in which input messages from terminal equipments are queued.

The above resources are defined by the environment definition set 19 stored in a file identified by the job control language 18. The first message queue 23 for the current job 25 and the second message queue 24 for the waiting job 26 having the same name (the same destination code) as the first message queue 23 are provided in the system so that the current job 25 can be replaced with the waiting job 26 to be activated. Each of the first and second message queues 23 and 24 are also one of the resources in the processing system. When the replacing command is supplied to the processing system, it is determined messages queued in the first message queue 23 and messages supplied from the terminal devices 28-1 and 28-2 relate to the service currently being performed or to the new service to be performed. The above messages are distributed so that the messages relating to the service currently being performed are processed in the current job 25 and the messages relating to the service to be processed in the waiting job 26.

After all the messages relating to the service currently being performed are completely processed, the current job 25 is deactivated, and the resources for the job 25 are withdrawn from the current job 25. Thus, after this, the waiting job 26 can be processed as a current job.

A description will now be given, with reference to FIGS.3A, 3B, 4A, 4B and 5, of an embodiment of the present invention.

Figure 3A:
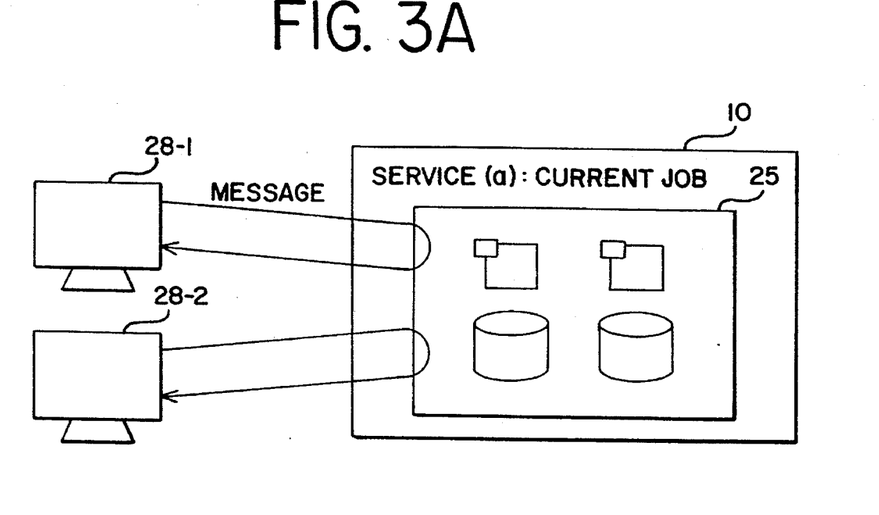
FIG. 3A is a diagram illustrating a processing system in which a service is performed in accordance with a current job.

Assuming that, as shown in FIG. 3A, an online service is being performed by a current job 25 using application programs for the service (a), the application programs are updated and new application programs and new data base are added to the system to extend service. In this case, the following operations are performed to replace the job.

Figure 3B:
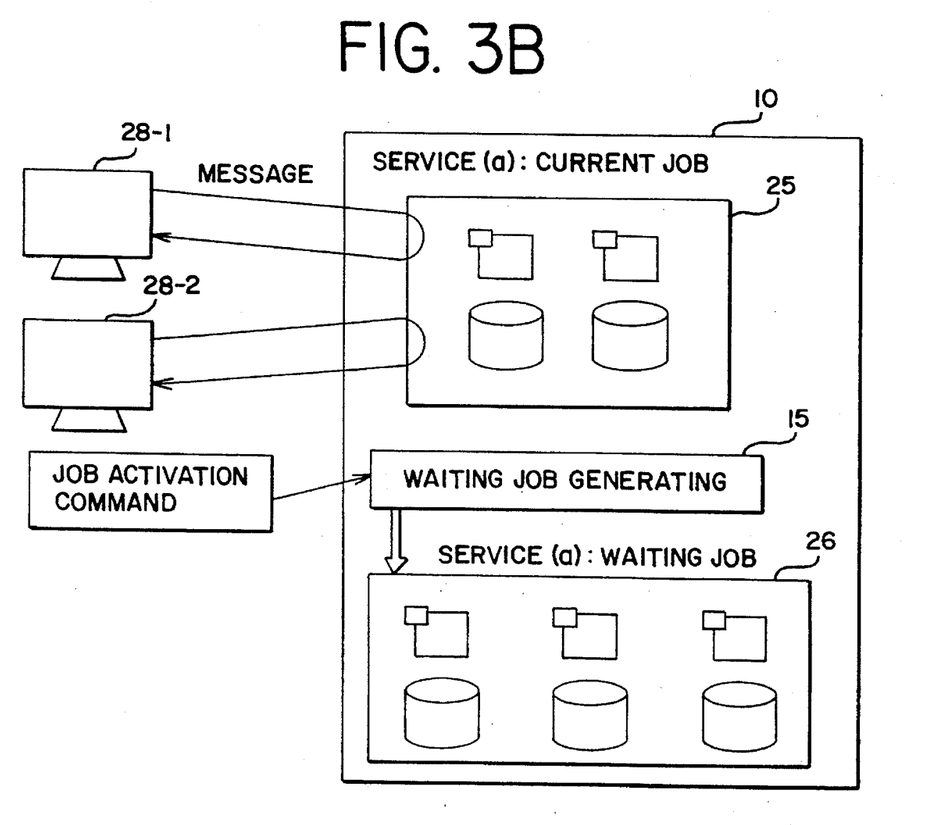
FIG. 3B is a diagram illustrating the processing system to which a job activation command is supplied.
Figure 4A:
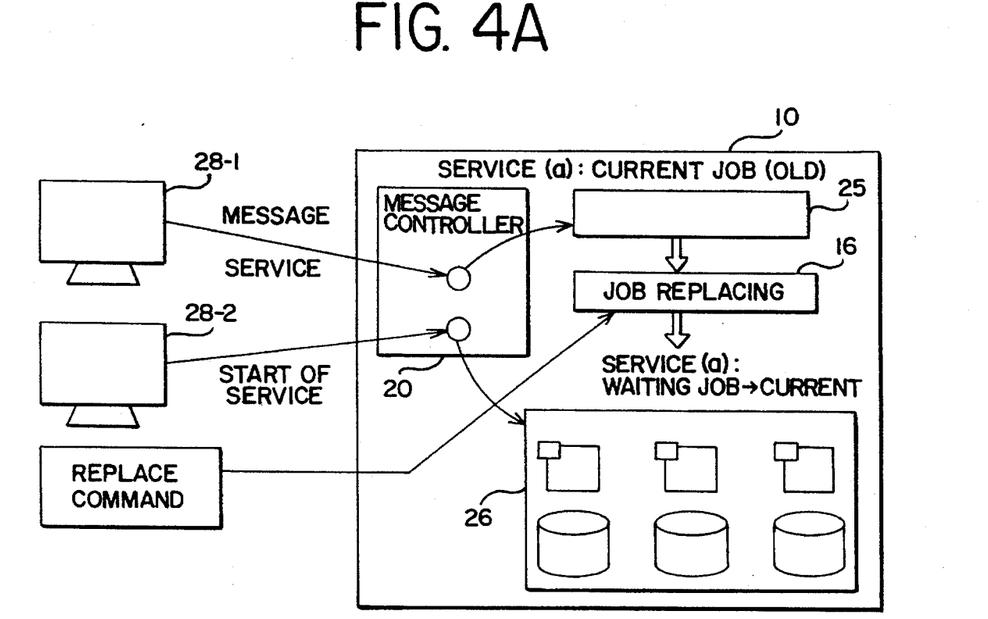
FIG. 4A is a diagram illustrating the processing system to which a replacement command is supplied.

If an update of the job control language 18 and the environment definition set 19 is needed, the job control language 18 and the environment definition set 19 are previously updated. In response to an activation command supplied to the processing system 10, a new job is generated by the job generating unit 15, as shown in FIG. 3B. At this time, the service is continuously performed by the current job 25. The new job is referred to as the waiting job 26, and the waiting job 26 is in the waiting condition until a processing request message is supplied to the system 10. After the generation of the waiting job is completed, the replacement command is supplied to the processing system 10, as shown in FIG. 4A. In response to the replacement command, the job replacing unit 16 releases the waiting job 26 from the waiting condition. As a result, two services are simultaneously performed by both the current job 25 and the job 26 which has been released from the waiting condition. The message controller 20 assigns messages used in the middle of the service to the current job 25, and assigns messages for the service which will be started to the waiting job 26.

Figure 4B:
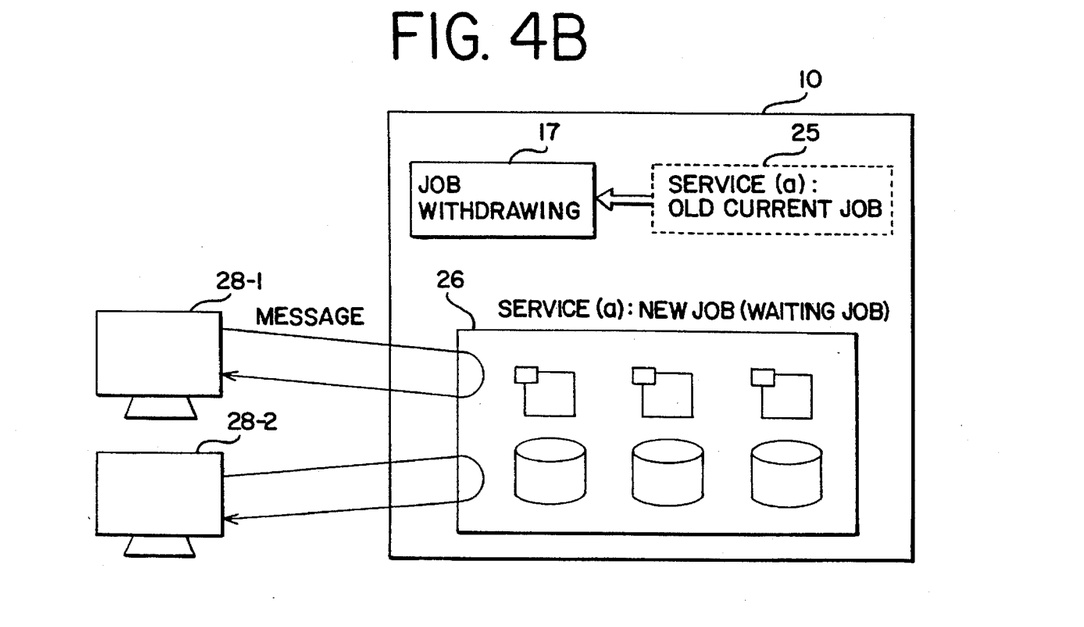
FIG. 4B is a diagram illustrating the processing system in which resources for the current job are withdrawn, and a new job (a waiting job) is activated.

When the service is completed, which service has been performed from a time the replacement command is supplied, the job withdrawing unit 17 withdraws old environment of the current job 25 therefrom, as shown in FIG. 4B. After this, the waiting job 26 which has been released from the waiting condition is performed as a new current job, so that the extended service is carried out under the new job environment.

Figure 5:
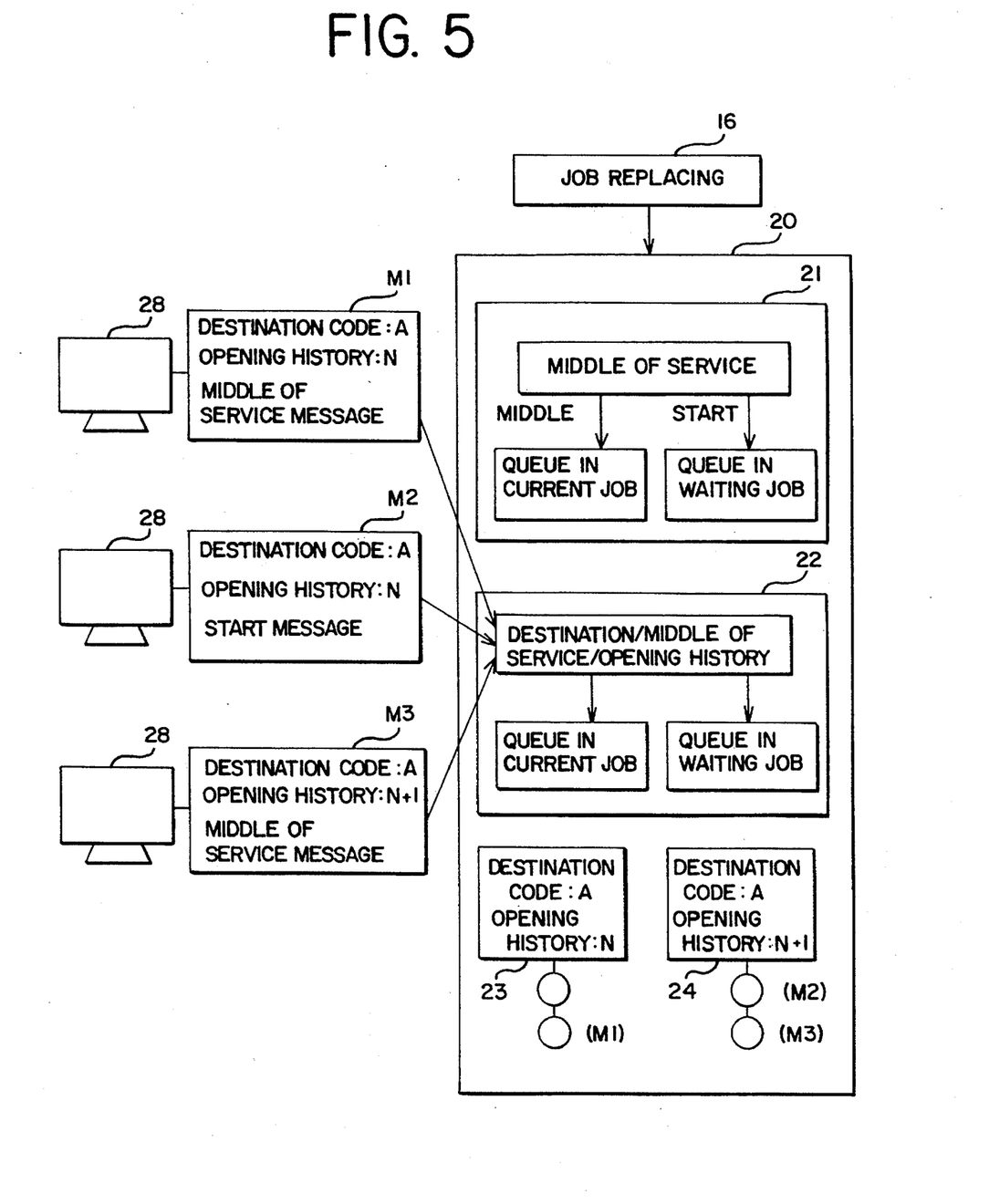
FIG. 5 is a diagram illustrating the processing system receiving various messages from terminal devices.

The distribution of input messages at a time the replace command is supplied is performed, for example, as shown in FIG. 5.

Each of the input messages has a destination code, an opening history, and information indicating whether or not the input message is a start message. The destination code identifies an application program, and each message is supplied to an application program identified by the destination code thereof. The opening history indicates the number of times the application program has been opened. The start message is a message indicating the starting of service. A message queue is provided in the message controller 20 for very destination code of the application program. The first message queue 23 for the current job 25 and the second message queue 24 for the waiting job 26 have the same destination code, for example, a code A. The opening history is managed by the message queue. The number of time is of opening of the application program, indicated in the opening history, is incremented by one every time the start message is received. Information of the opening history is returned to the terminal device having supplied the start message to the message controller 20.

When the lob replacing unit 16 supplies a transference instruction of messages to the message controller 20, the message controller 20 activates the message queue distribution portion 21. The message queue distribution portion 21 determines whether or not each of the messages in the first message queue 23 is the start message, starting from a leading message to an end message in the first message queue 23. Based on the determination result, a message to be used in the service currently performed is maintained in the first message queue 23, and a start message is transferred to the second message queue 24 having the same destination code as the first message queue 23 and is queued in the second message queue 24.

Messages received by the message controller 20 after receiving the transference instruction are distributed to the message queues by the received message distribution unit 22, as follows.

For example, when a message M1 is supplied to the message controller from a terminal device 28, the first message queue 23 identified by the destination code having the message M1 is located. It is then determined whether or not the message M1 is a message to be used in the middle of the service performed. If it is determined that the message M1 is a message to be used in the middle of the service, the opening history N set in the message M1 is compared with the opening history N managed by a queue terminal of the first message queue 23. In this case, as the opening history N set in the message M1 is equal to the opening history N managed by the queue terminal, it is determined that the message M1 is to be used in the middle of the service performed by the current job 25 at a time the transference instruction is received. As a result, the message M1 is queued in the first message queue 23.

Next, it is assumed that a second message M2 is received by the message controller 20. Since the second message is the start message, the received message distribution unit 22 supplies the second message M2 to the second message queue 24 identified by the destination code provided with the second message M2, and the second message M2 is queued in the second message queue 24. At this time, the opening history provided with the second message queue 24 is updated to N+1.

Further, when a third message M3 is received by the message controller 20, the destination is determined to which the third message M3 is supplied and whether or not the third message M3 is to be used in the middle of the service. As the third message is a message used in the middle of the service, the opening history (N+1) provided with the third message M3 is compared with the opening history N of the first message queue 23. In this case, the opening history (N+1) of the third message M3 is not equal to the opening history N of the first message queue 23. Thus, it is determined that the third message M3 is to be used in the new service, so that the third message M3 is supplied to the second message queue 24 and queued therein.

Figure 6A:
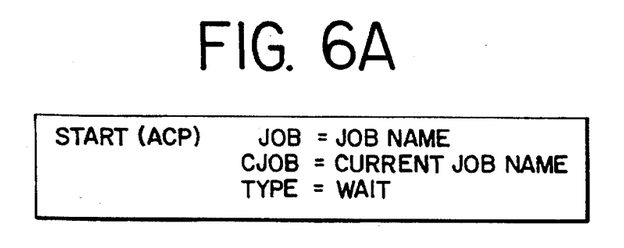
FIGS. 6A and 6B are diagrams illustrating commands supplied to the processing system.
Figure 6B:
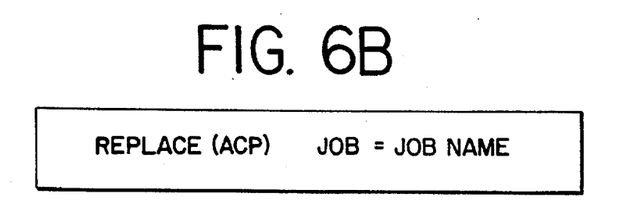

FIGS. 6A and 6B indicate examples of commands used in the above processing system 10.

FIG. 6A indicates a command for activating the waiting job. The waiting job is activated by a start command (START) in the same manner as a normal job. In FIG. 6A, "ACP" is a name of sub-command for controlling the application program. "JOB=" is a parameter key identifying a name of the job. "CJOB=" a parameter key identifying a name of the current job corresponding to the waiting job to be activated. "TYPE=WAIT" is a parameter indicating the instruction to assign the waiting attribute to the job to be activated.

FIG. 6B indicates a command for replacing the job. In FIG. 6B, "REPLACE" is a name of a command, and "ACP" is a name of a sub-command. The waiting job by which the current job is to be replaced is identified by the JOB parameter.

Figure 7:
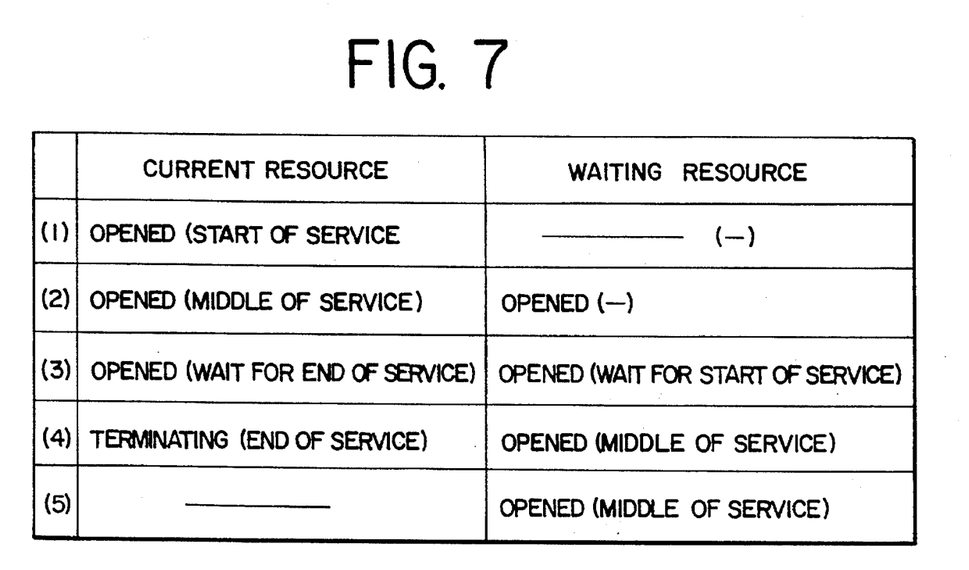
FIG. 7 is a diagram illustrating state transition of message queues.

FIG. 7 shows state transition of the message queue.

Referring to FIG. 7, the state transition is carried out starting from a first state (1) and ending at a fifth state (5).

In the first state (1), before the waiting job 26 is activated, only a current resource (the first message queue 23 for the current job 25) has been opened.

In the second state (2), when the waiting job 26 is activated, a waiting resource (the second message queue 24 for the waiting job 26) has been opened. The current resource is being used in the service.

In the third state (3), when the instruction to transfer the messages is raised by the replacement command, the first message queue 23 is brought into a state where it waits for the service which has been started to be completed. The second message queue 24 is brought into a state where it waits for the new service to start.

In the fourth state (4), when the service of the current job 25 has been completed, the withdrawing process is performed with respect to the first message queue 23, and the new service is continuously performed in accordance with messages in the second message queue 24.

In the fifth state (5), the first message queue 24 is substituted for the first message queue 23, so that the new service is performed under a changed environment.

The above respective states (1) through (5) are managed using flags of a management table provided in the queue terminals of the message queues.

Figure 8:
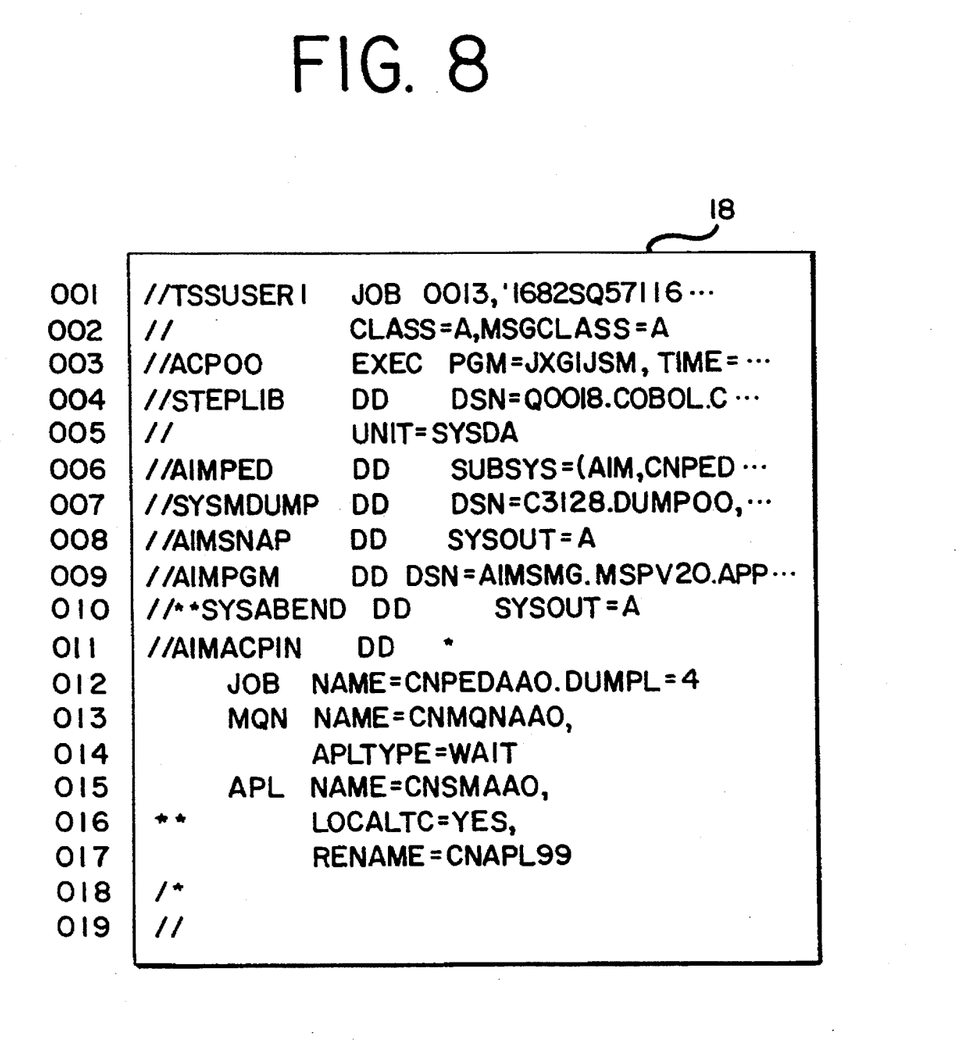
FIG. 8 is a diagram illustrating examples of job control language.

FIG. 8 indicates examples of the job control language (JCL).

Referring to FIG. 8, lines 001 and 002 indicate JOB-language for defining a job. A line 003 indicates an EXEC-statements for identifying an application problem to be executed. In this example, a name of the application program is "JXGIJSM". Lines 004–011 indicate DD statements for defining a data set used in the job. Specifically, the line 011 indicates a DD statement for defining a job environment.

The following matter is important in the present invention.

The current job 25 is activated using the job control language 18 as indicated in FIG. 8, and the waiting job 26 can be also activated using the same job control language 18 as the current job 25. It is not necessary that the job control language used for activating the current job 25 be perfectly equal to those used for activating the waiting job 26. The job control language for the waiting job 26 may be changed within the scope of consistency.

Figure 9:
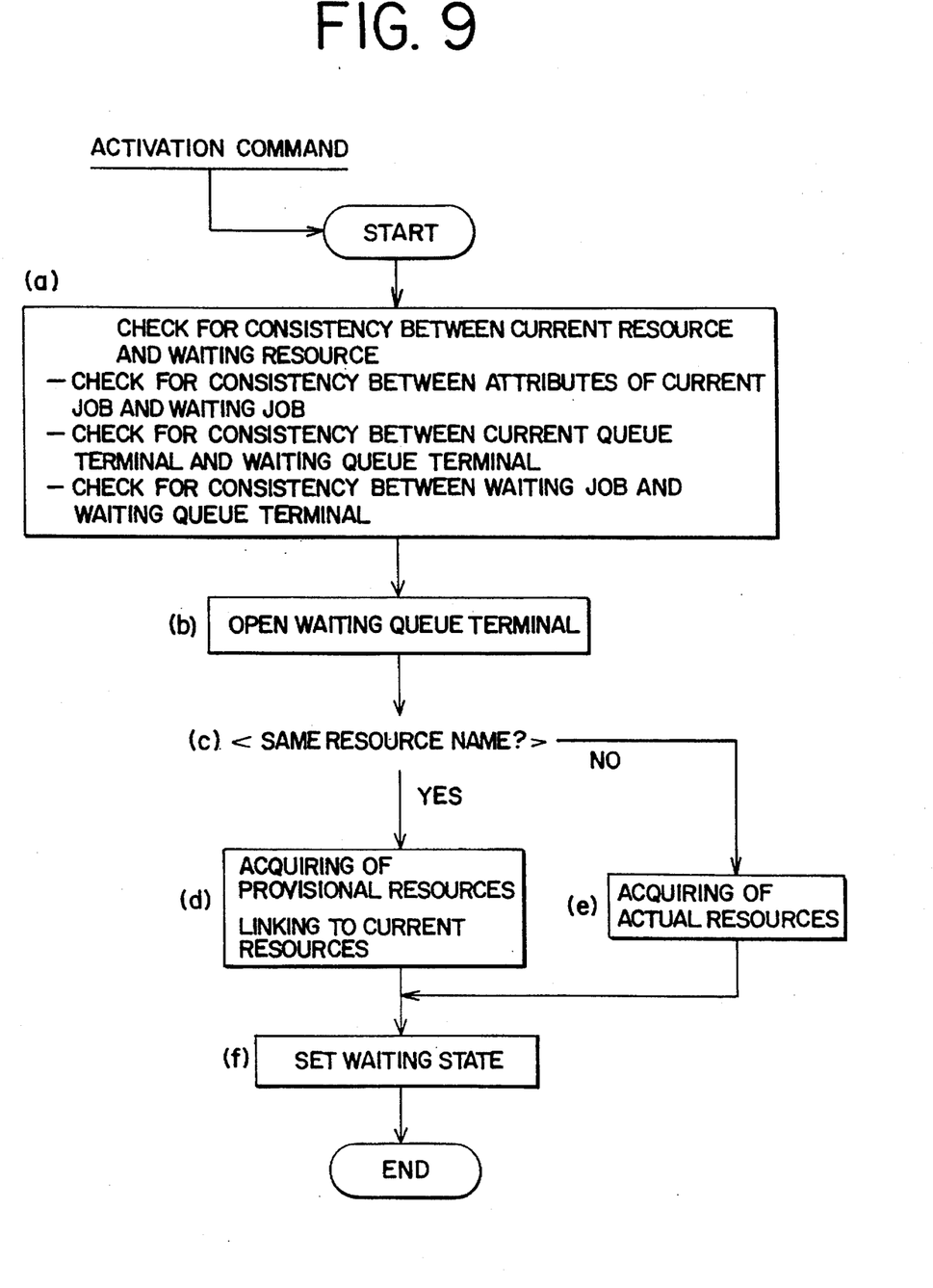
FIG. 9 is a flow chart illustrating an operation of a job generating unit.

The job generating unit 15 operates in accordance with a flow chart shown in FIG. 9.

Referring to FIG. 9, the process is formed of steps (a), (b), (c), (d), (e) and (f). In a step (a), when the activation command is supplied from the job activating instruction unit 12, the job generating unit 15 checks for consistency between the resources for the current job 25 and the resources for the waiting job 26. That is, the job generating unit 15 checks for the consistency between attributes assigned to the current job 25 and attributes assigned to the waiting job 26, for consistency between the queue terminal of the first message queue 23 for the current job 25 and the queue terminal of the second message queue 24 for the waiting job 26, and for consistency between the waiting job 26 and the queue terminal thereof. In concrete, it is checked whether or not the relationships between the terminal devices and the application programs are maintained after replacing the current job with the waiting job, and whether or not accesses with respect to the data bases can be guaranteed after replacing the current job with the waiting job. The above checks are carried out every definition statement. If the resources for the current job 25 and the waiting job 26 are in consistent, the operation for activating the waiting job undergoes an error, so that an error message is output from the job generating unit.

In step (b), when it is determined that the resources for the waiting job 26 are consistent with the resources for the current job 25, the queue terminal of the second message queue 24 for the waiting job 26 is opened.

In step (c), it is determined whether or not the respective resources defined in the waiting job 26 have the same destination codes as those for the current job 25. Resources for the waiting job 26 having the same destination code as those for the current job 25 are processed in step (d). On the other hand, resources for the waiting job 26 having destination code different from those for the current job 25 are processed in step (e).

In step (d), as to the resources having the same destination codes as those of the current job 25, information indicating that the resources are acquired in the system is set in a control table of the resource management. This operation is referred to as an acquiring of provisional resources. Information indicating the relationship between the control table of the resource management for the waiting job 26 and the control table of that for the current job 25 is set in the system, so that the resources for the waiting job 26 are linked to those for the current job 25.

In step (e), as to the resources having destination codes different from those of the resources for the current job 25, the resources for the waiting job 26 are actually acquired in the system.

In step (f), after the resources for the waiting job 26 have been acquired in the system, the waiting job 26 is set to be in the waiting state.

Figure 10:
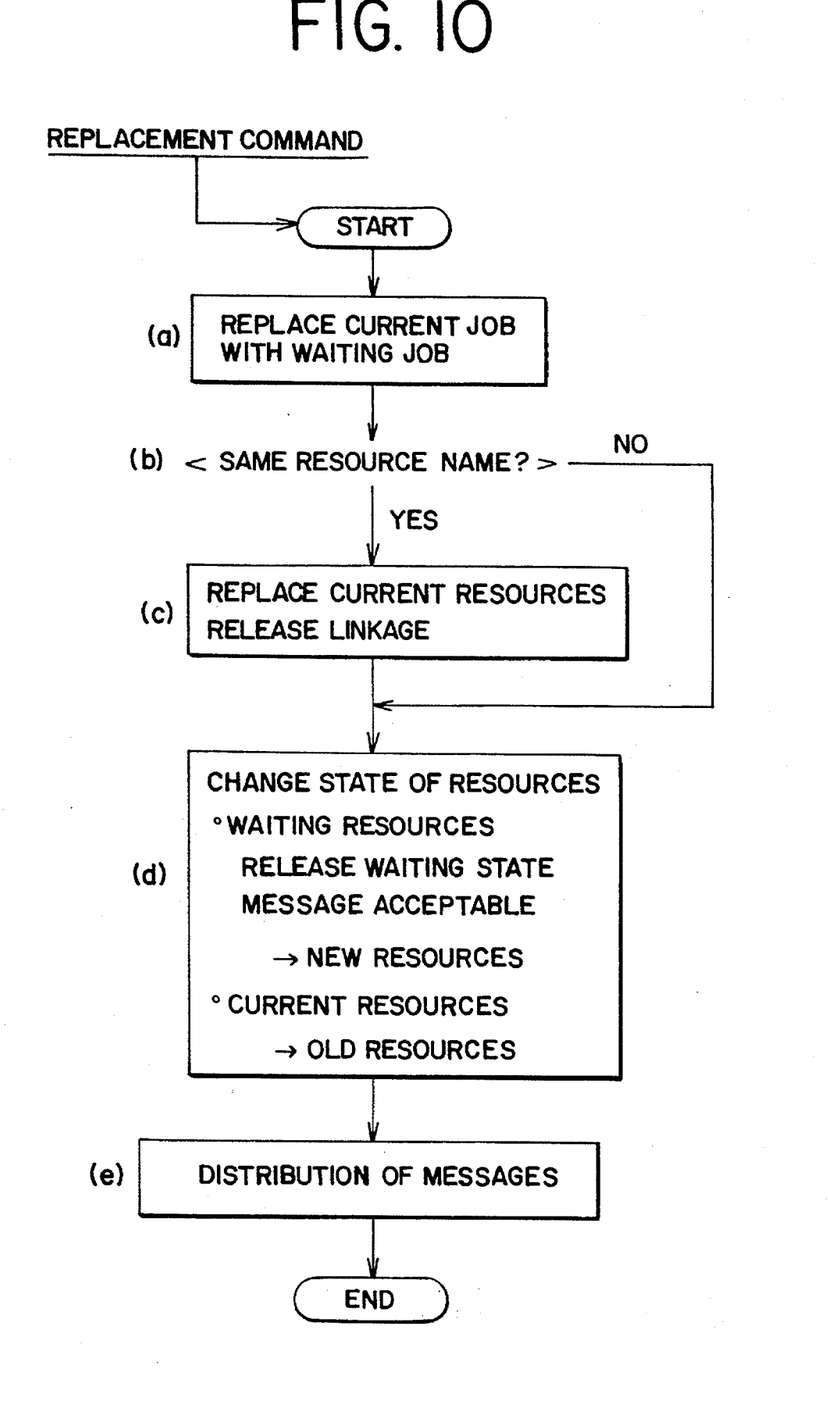
FIG. 10 is a flow chart illustrating an operation of a job replacing unit.

The job replacing unit 16 operates in accordance with a flow chart shown in FIG. 10.

Referring to FIG. 10, the process is formed of steps (a), (b), (c), (d) and (e). In step (a), when the replacement command is supplied from the job replacing instruction unit 13, the job replacing unit 16 activates the second message queue 24 for the waiting job 26 to replace the current job 26 with the waiting job 26.

In step (b), it is determined whether or not the respective resources for the waiting job 26 have the same destination code as those for the current job 25.

In step (c), if a resource for the waiting job 26 has the same destination code as that for the current job 25, the resource for the waiting job 26 which has been acquired as the provisional resource in the system is actually assigned to the waiting job 26. The linkage between the resource and that for the current job 25 is released.

In step (d), the waiting job 16 is released from the waiting state, and the second message queue 24 for the waiting job 26 becomes a state in which messages can be accepted therein. The second message queue 24 is controlled as a new resource in the system. On the other hand, the resources for the current job 25 are controlled as old resources, and are used in only the service currently being performed. The resources for the current job 25 assumes a waiting state of termination of the service.

In step (e), the message queue distribution portion 21 distributes messages to the first message queue 23 and the second message queue 24.

Figure 11:
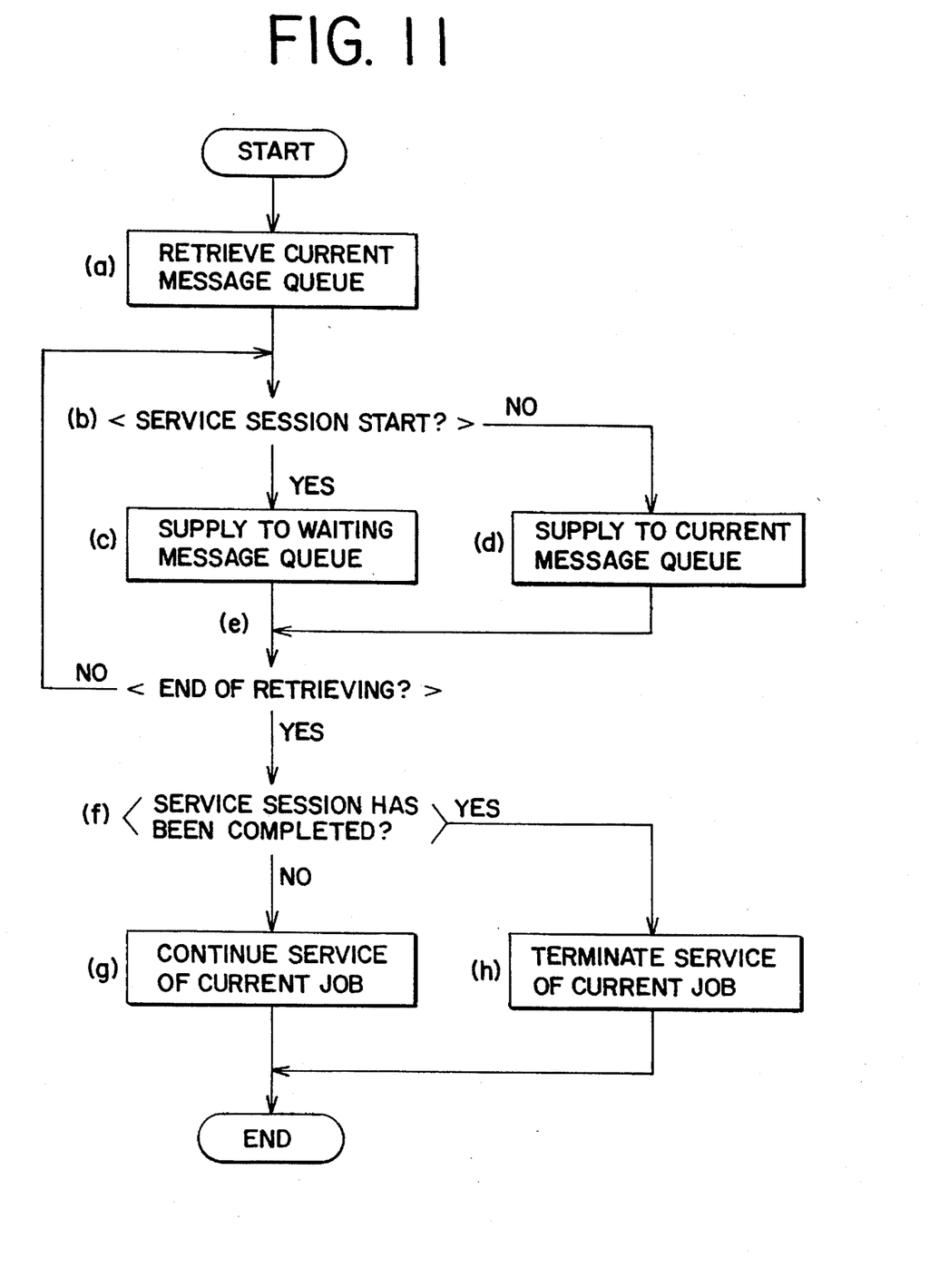
FIG. 11 is a flow chart illustrating an operation of a message queue distribution portion.

The message queue distribution portion 21 operates in accordance with a flow chart shown in FIG. 11.

Referring to FIG. 11, the process is formed of steps (a), (b), (c), (d), (e), (f), (g) and (h). In step (a), the messages queued in the first message queue for the current job 25 are retrieved, the messages are processed as follows.

In step (b), it is determined whether or not a message queued in the first message queue 23 is a service session start message. If the message is service session start message, the process proceeds to step (c). On the other hand, if the message is not a service session start message, the process proceeds to step (d). The service session is a single unit of a conversation processing.

In step (c), the message which is the service session start message is supplied to the second message queue 24 for the waiting job 26 and is queued therein.

In step (d), the message which is not the service session start message is maintained in the first message queue 23 for the current job 25.

In step (e), the above processes in steps (b) through (d) are repeated with respect to all the messages queued in the first message queue 23.

In step (f), it is determined whether or not the service session in accordance with the application program provided for the current job 25 has been completed.

If the service session has not yet been completed, the process proceeds to step (g). In step (g), the service is continued in accordance with the application program provided for the current job 25, and the messages in the first message queue 23 for the current job 25 are supplied to the current job 25 in accordance with requests.

If it is determined, in step (e), that the service session has been completed, the process proceeds to step (h). In step (h), a request for terminating the service in accordance with the application program is supplied to the job withdrawing unit 17 shown in FIG. 2. The job withdrawing unit 17 withdraws, in response to the request supplied thereto, the resources including the first message queue 23 for the current job 25.

Figure 12:
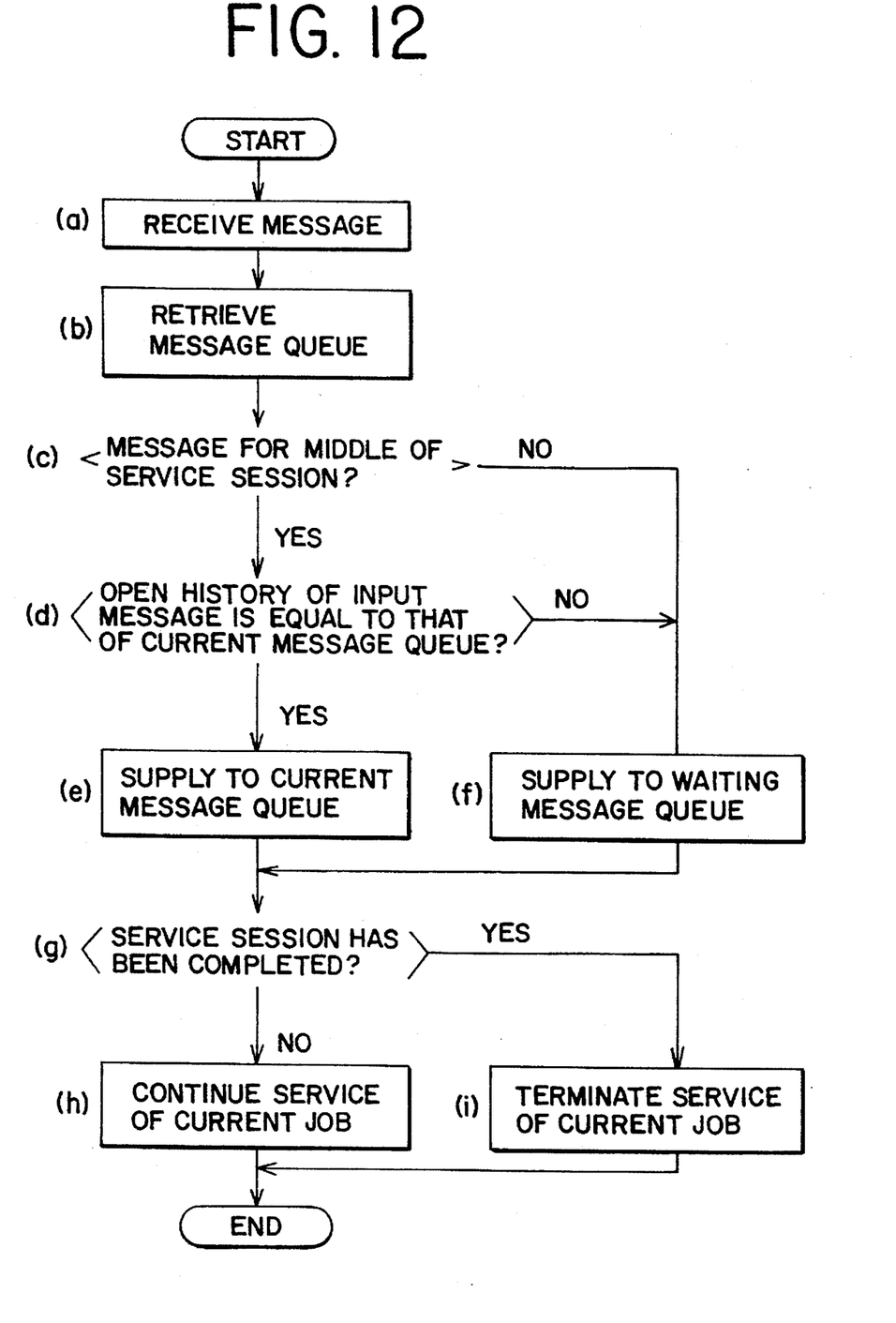
FIG. 12 is a flow chart illustrating an operation of a received message queue distribution portion.

The received message distribution unit 22 operates in accordance with a flow chart shown in FIG. 12.

Referring to FIG. 12, the process is formed of steps (a), (b), (c), (d), (e), (f), (g), (h) and (i). In step (a), after the replacement command is supplied from the job replacing instruction unit 13 to the processing system 10, the received message distribution unit 22 receives messages from the terminal devices 28-1 and/or 28-2. After this, the following steps are carried out.

In step (b), the destination code in an input message is detected, and a message queue identified by the detected destination code is selected.

In step (c), it is determined whether or not the input message is a message to be used in the middle of the service session.

In step (d), if the input message is a message to be used in the middle of the service session, it is determined whether or not the opening history of the input image is equal to that of the first message queue for the current job 25.

In step (e), if the opening history of the input message is equal to that of the first message queue 23, the input message is supplied to the first message queue 23 for the current job 25 and is queued therein. After this, the process proceeds to step (g).

If it is determined, in step c), that the input message is the start message, or it is determined, in step (d), that the opening history of the input message and that of the first message queue 23 are not equal to each other, the process then proceeding to step (f). In step (f), the input message is supplied to the second queue 24 for the waiting job 26 and is queued therein.

In step (g), it is determined whether or not the service session in accordance with the application program provided for the current job 25 has been completed.

If the service session has not been completed yet, the process proceeds to step (h). In step (h), the service is continued in accordance with the application program of the current job 25. Messages in the first messages in the first message queue 23 for the current job 25 are supplied to the current job 25 in accordance to requests.

If it is determined, in step (g), that the service session has been completed, the process proceeds to step (i). In step (i), a request for terminating the service in accordance with the application program is supplied to the job withdrawing unit 17 shown in FIG. 2. The job withdrawing unit 17 withdraws, in response to the request supplied thereto, the resources including the first message queue 23 for the current job 25.

According to the above embodiments, the current job 25 can be replaced with the waiting job 26 without interrupting the service.

The present invention may be applied to a hot standby system and a multi-job system.

The present invention is not limited to the aforementioned embodiments, and variations and modifications may be made without departing from the scope of the claimed invention.

What is claim is:

1. A processing system in which a currently executed job uses resources of a first environment, the processing system comprising:

job activating instruction means for outputting an activation instruction to activate a new job for execution within a second environment;

job generation means, coupled to said job activating instruction means, for generating the new job and for assigning a waiting attribute to the new job so that the new job is in a waiting condition, in response to the activation instruction from said job activating instruction means;

job replacing instruction means for outputting a replacement instruction to replace the current job with the new job being in the waiting condition;

job replacement means, coupled to said job replacing instruction means, for selecting resources to be used in the new job from the resources used in the currently executed job, for assigning the selected resources to the new job, and for releasing the new job from the waiting condition, in response to the replacement instruction from said job replacing instruction means; and currently executed job withdrawing means, coupled to said job replacement means, for withdrawing the currently executed job from said processing system after operations of said job replacement means are completed.

2. A processing system in which a current job is being executed, the processing system comprising:

messages regarding a service to be executed, supplied from external devices, and having destination codes which identify an application program in which the messages are to be supplied and opening histories which are used to distribute said messages;

message control means for managing a current job message queue and a waiting job message queue so that said messages are distributed to said message in accordance with the destination codes and the opening histories; and job activating means for activating a waiting job from the waiting job message queue, the waiting job being identified by the same destination code but a different opening history as the current job, wherein said message control means comprises:

message distribution means, in response to an instruction to replace the current job with the waiting job, for assigning a message having the same destination code and opening history as the current job to the message queue for the current job, and for assigning a message having the same destination code and opening history as the waiting job to the message queue for the waiting job.

3. A processing method executed in a processing system in which a current job executes a first service using resources related to a first environment, said processing method comprising the steps of:

(a) executing the current job;

(b) generating a waiting job using the resources related to the first environment;

(c) distributing messages regarding services executed by said jobs, supplied from external terminals, each of said messages having an opening history for indicating which service the messages are related to and used to distribute said messages to the current job and the waiting job so that messages used in the first service are assigned to the current job and messages used in a second service are assigned to the waiting job;

(d) terminating the current job upon a completion of the first service and withdrawing the resources related to the first environment; and (e) replacing the current job with the waiting job.

* * * * *

UNITED STATES PATENT AND TRADEMARK OFFICE
CERTIFICATE OF CORRECTION

PATENT NO. : 5,511,194
DATED : Apr. 23, 1996
INVENTOR(S) : Shirakata et al.

It is certified that error appears in the above-indentified patent and that said Letters Patent is hereby corrected as shown below:

Column 3, line 13, after "message", insert --are--

Column 5, line 34, delete "of" and insert --for--

Column 7, line 7, delete "very" and insert --every--

Column 7, line 17, delete "lob" and insert -- job--

Column 11, line 10, delete "c)" and insert --(c)-- (From page 20, line 28

Column 12, line 22, after "to said message", insert --Qeues--

Signed and Sealed this

Twelfth Day of August, 1997

*Attest:*

BRUCE LEHMAN

*Attesting Officer*  *Commissioner of Patents and Trademarks*